Figure 1:
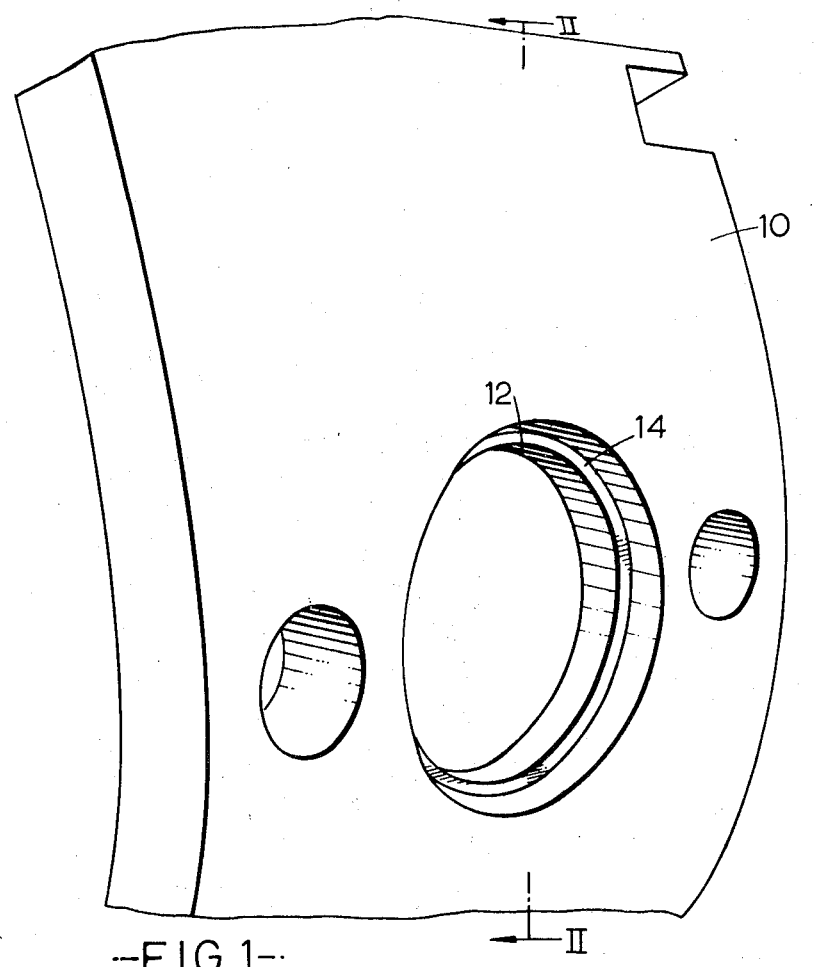

United States Patent
Atherton

[15] 3,645,639
[45] Feb. 29, 1972

[54] BORING MACHINES
[72] Inventor: John Atherton, Halifax, England
[73] Assignee: Staveley Machine Tools Limited, Halifax, England
[22] Filed: Aug. 1, 1969
[21] Appl. No.: 846,895

[52] U.S. Cl. ..........................................408/146
[51] Int. Cl. ........................................B23b 29/03
[58] Field of Search ...............77/58, 58.1, 1, 3, 4; 408/146

[56] References Cited

UNITED STATES PATENTS 2,295,543   9/1942   Bullard ..........................................77/4
3,178,972   4/1965   Beebee ..........................................77/3

*Primary Examiner*—Gerald A. Dost
*Attorney*—Norris & Bateman

[57] ABSTRACT

A boring machine attachment to enable a recess of constant depth to be bored around a hole in a cylindrical wall, comprises a toolholder adapted for powered compound movement having a rotary component and an axial reciprocating component, said toolholder 50 being capable of axial movement in guides (said guides being adapted to provide said rotary component of said compound motion) and a crank device operatively connected to said toolholder to produce axial reciprocation of said toolholder in timed relationship to the mechanism which produces said rotary motion.

10 Claims, 7 Drawing Figures

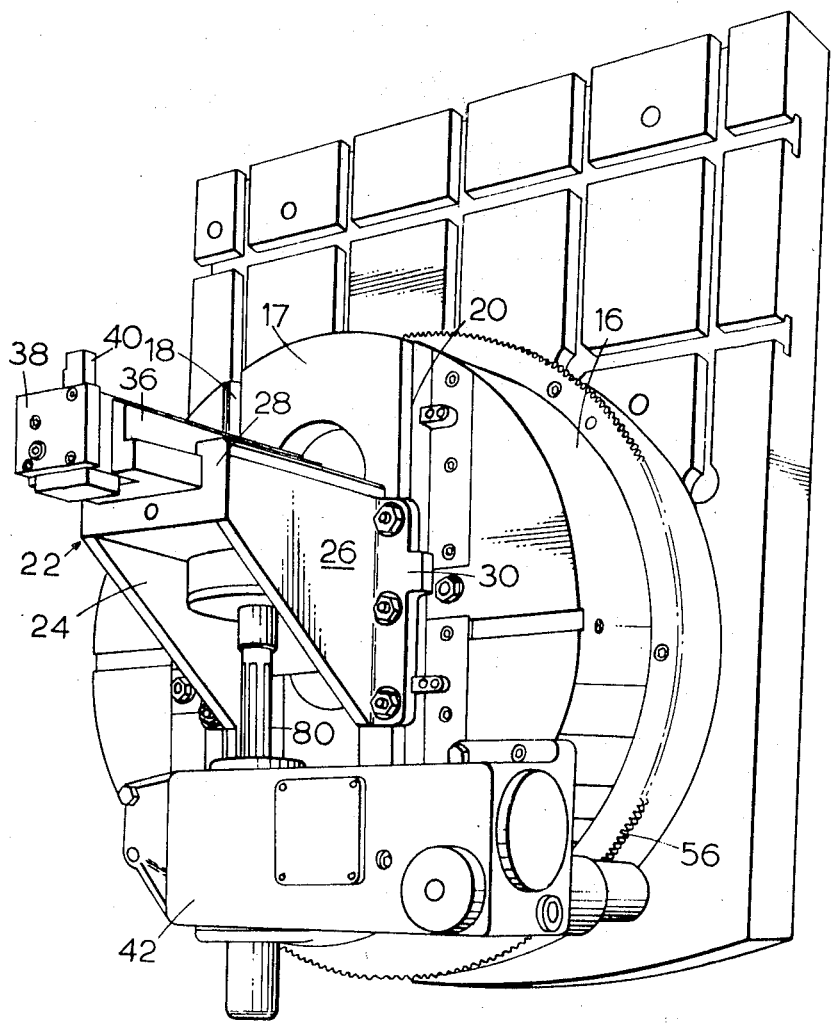

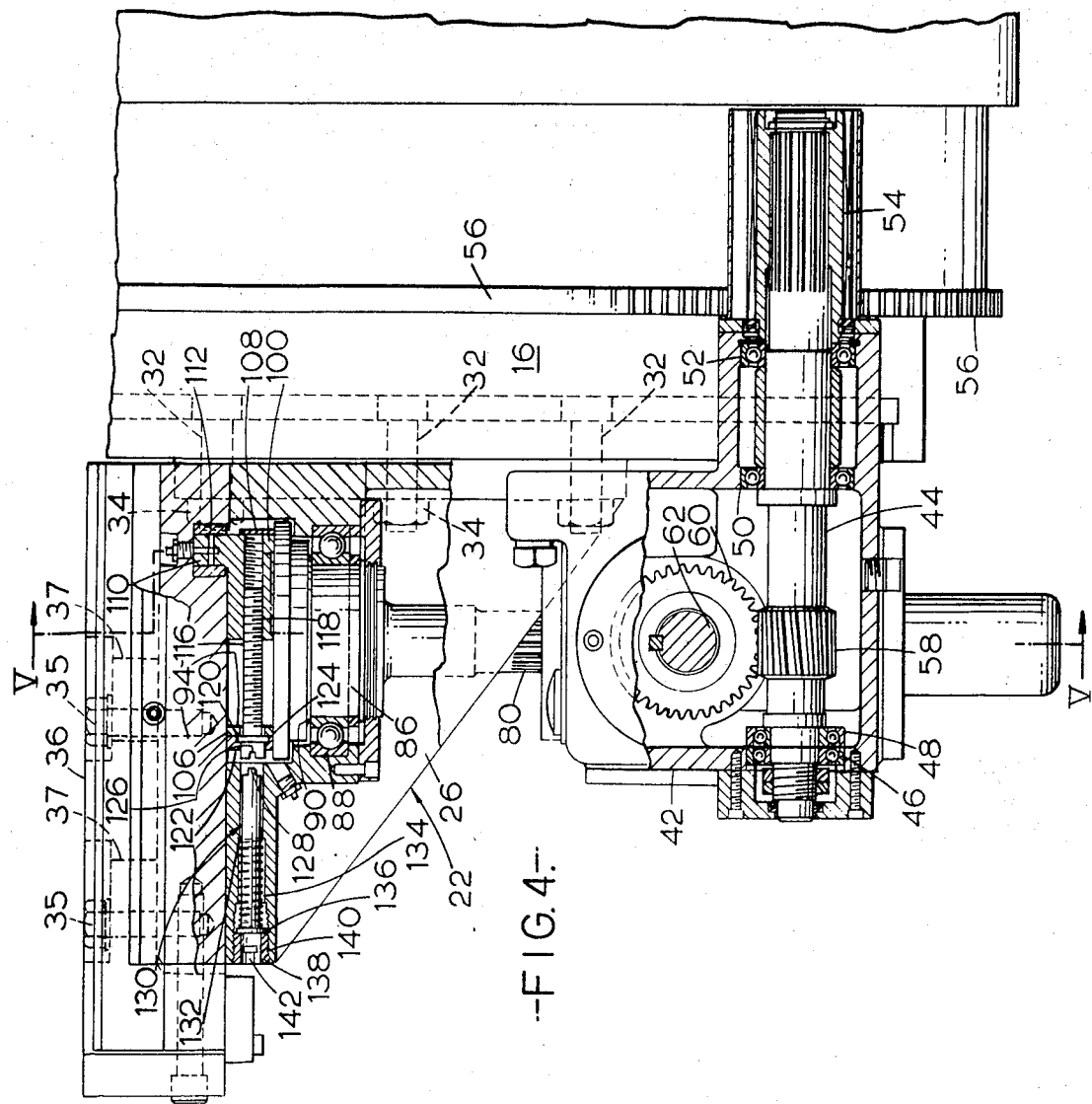

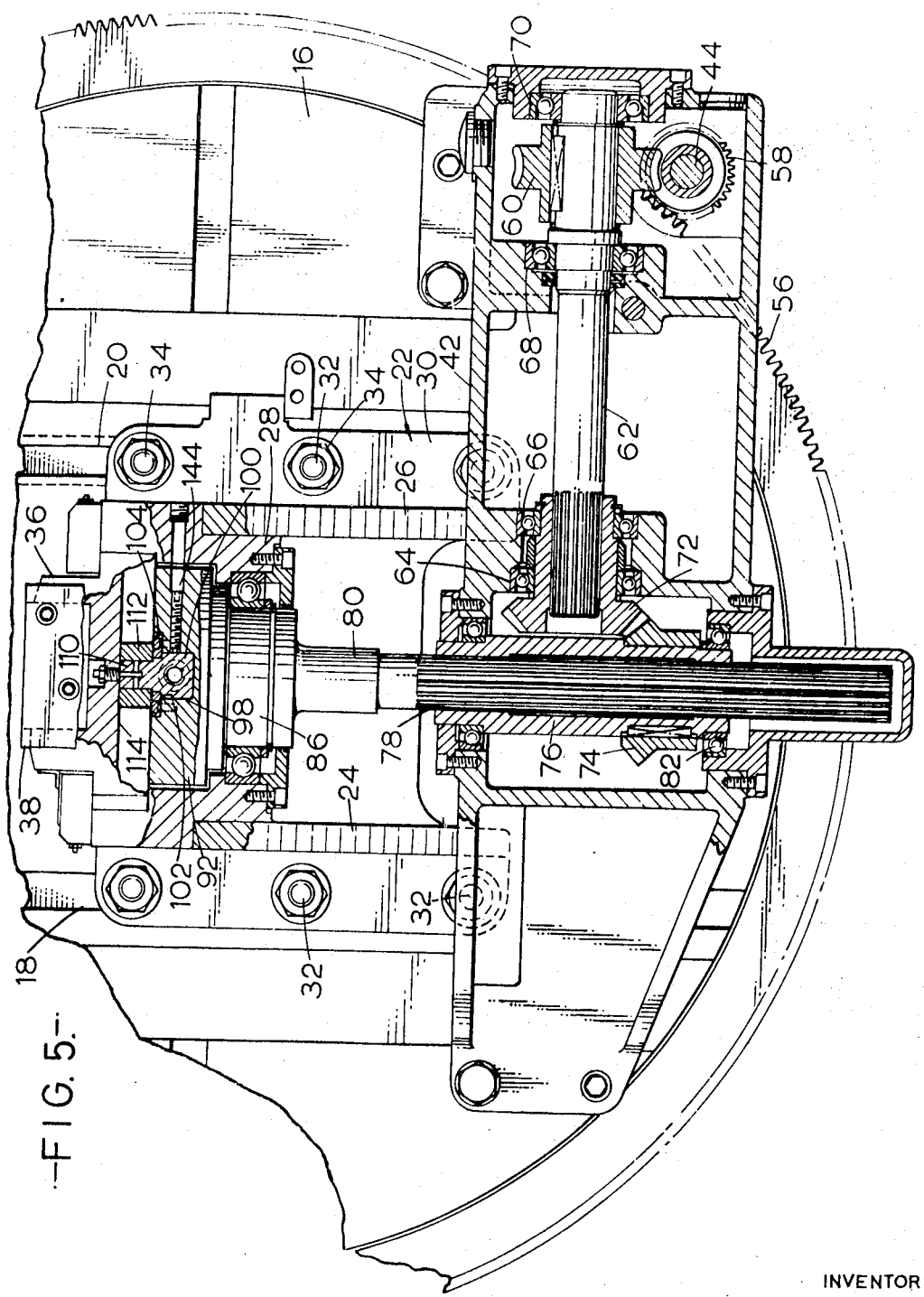

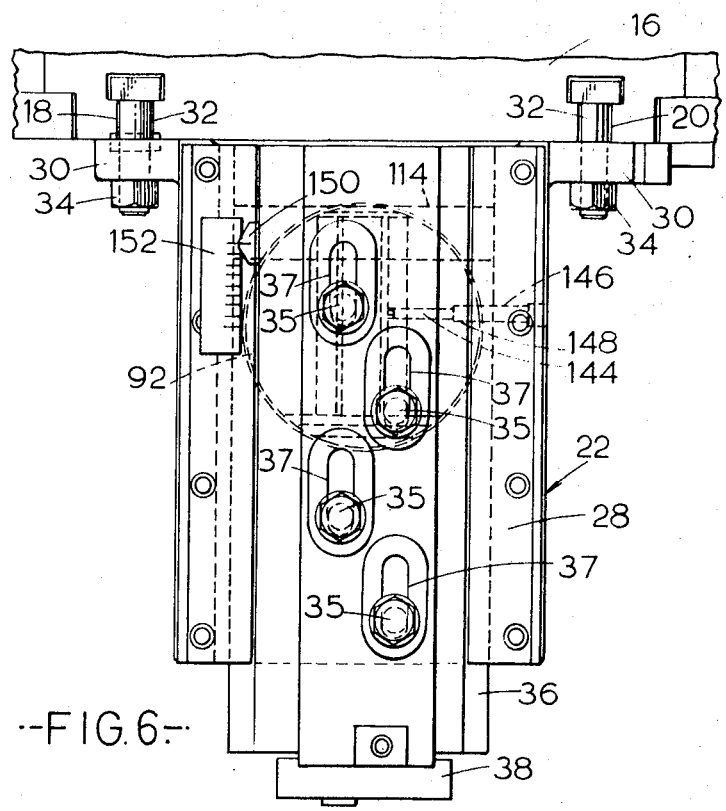

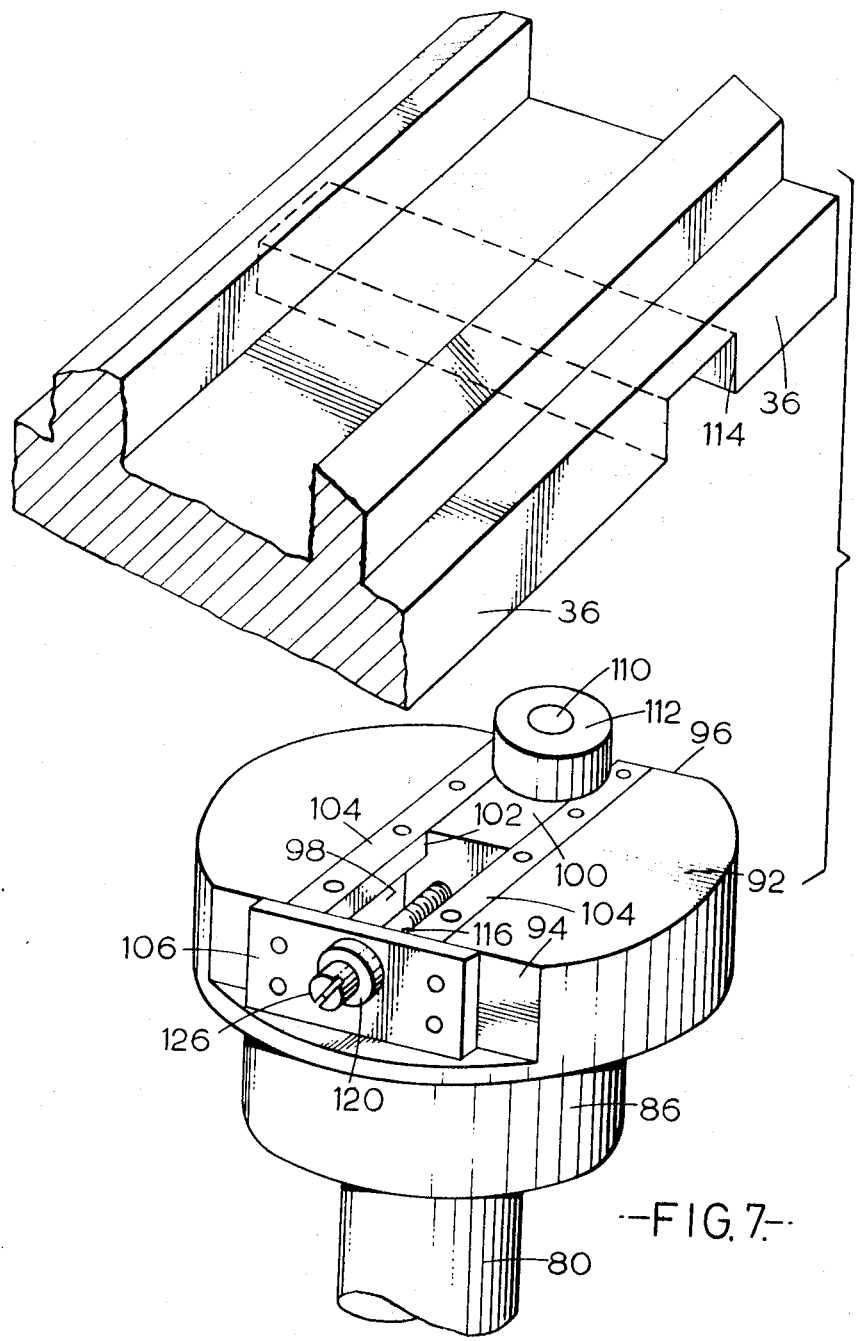

BORING MACHINES

In the construction of boilers, drums and similar cylindrical containers, it is sometime necessary to provide nozzles or tubes projecting radially from the cylinder wall. It is comparatively easy to bore a hole to receive a cylindrical member (such as a nozzle or tube) in a cylindrical wall, since a planar projection of such a hole is circular and conventional boring apparatus can therefore be used. For some purposes (e.g., power station equipment) it is also necessary to cut out a recess around the bore to accommodate a weld. This presents a problem, because the base of the recess has to follow the contour of the cylinder in which it is cut, and at the present time, the only known way of doing this is to chip the recess out by hand. This is a skilled and laborious operation.

According to this invention a boring machine is provided with a tool holder adapted for powered compound movement having a rotary component and an axial reciprocating component in which the drive mechanism to the tool holder is arranged to produce a complete axial reciprocation of the tool holder for every 180° rotation of the toolholder, and in which the toolholder is capable of axial movement in guides (which are themselves adapted to provide the rotary component of the compound motion), and a crank device operatively connected to the toolholder slide to produce axial reciprocation thereof, the crank being driven in timed relationship to the mechanism which produces the rotary motion.

The eccentricity or offset of the crank pin is preferably determined by the formula:

$$\text{Offset} = \frac{(R - \sqrt{R^2 - r^2})(1 - \cos 2\theta)}{2}$$

The theoretical offset required of the pin on the disc is given by the formula:

$$\text{Offset} = \frac{R - \sqrt{R^2 - (r \sin \theta)^2}}{2}$$

where
$R = O/s$ radius of drum
$r =$ radius of hole
$\theta =$ angle of rotation of cutter If these are plotted it can be seen that the actual contour obtained does not match exactly the contour required, but the contour obtained is within acceptable limits of accuracy.

Figure 2:
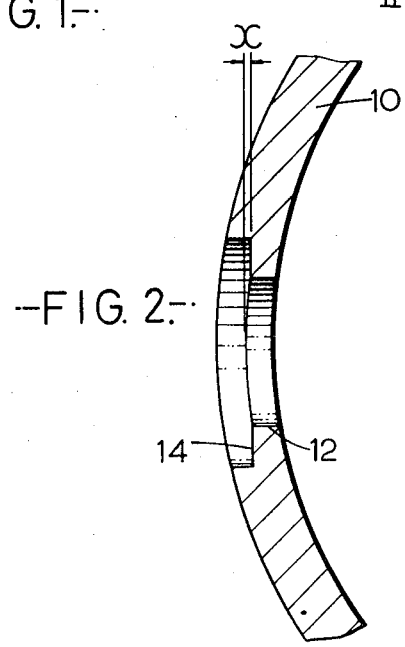

A boring machine adapted for recessing circular holes in cylindrical walls will now be described by way of example only, with reference to the accompanying drawings, in which:

FIG. 1 is a perspective view of a portion of a cylindrical wall, with a recessed hole formed in it, FIG. 2 is a section on the line II—II in FIG. 1, FIG. 3 is a perspective view of a boring machine rotary surfacing head, with a recessing attachment, FIG. 4 is a vertical section through the recessing attachment, FIG. 5 is a section on the line V—V in FIG. 4, FIG. 6 is a plan view of the recessing attachment, and FIG. 7 is a perspective view of reciprocating mechanism for a toolholder.

Referring to FIGS. 1 and 2 of the drawings, there is illustrated a typical machining problem of the kind which can be met by the use of a boring machine in accordance with the invention. A steel plate 10, which forms part of a cylinder is intended to be used in the fabrication of a boiler. A hole 12 is formed through the plate 10, to accommodate a tube (not shown) and the plate has to be recessed on the outside around the hole 12, as indicated at 14, for welding the tube to the plate. A similar recess (not shown) may also be required on the inside of the plate around the hole. It will be appreciated that the recessing presents machining difficulties if the recess is required to be of constant or near constant depth, because the recessing tool must be reciprocated the distance $x$ (FIG. 2) through each 180° rotation of the tool.

In this specific example the invention is described as applied to a conventional floor-type horizontal boring machine. It will readily be appreciated, however, that it can be applied to other types of boring machines or indeed any other machine tool with a rotating spindle. Equally, the invention could be applied to a specially constructed machine having its own motor drive.

The boring machine (see FIG. 3) has a rotary surfacing head attachment 16 with cross-slide 17 on which the conventional toolholder (not shown) is normally mounted for radial adjustments. Two "Tee" slots 18 and 20 are disposed one on each side of the cross-slide 17.

For the purpose of the invention however, the toolholder is replaced by a cast metal support member 22 which comprises a pair of brackets 24 and 26 bridged by a bearing block 28. The support member has flanges 30 drilled to receive the conventional Tee bolts 32 fitted into the "Tee" slots 18, 20 whereby the support member can be adjusted radially on the attachment 16 and locked against the front face of that attachment by tightening nuts 34 engaged on the Tee bolts 32.

A groove is formed along the top of the support member 22 to provide a toolslide, and a toolholder 36 is slidable in this slide. As shown in FIGS. 4 and 6, there are bolts 35 engaging in slots 37 in the toolholder to retain the latter in the tool slide and to limit the sliding movement of the toolholder. The direction of this permitted sliding movement of the toolholder is parallel to the axis of rotation of the surfacing attachment, (i.e., in the direction required by the reciprocation required to produce the recess 14). A clamp 38 of conventional design is provided at the front of the toolholder 36 to hold a cutting tool 40 in the radially directed position illustrated in FIG. 3.

The rotary motion of the cutting tool is provided by rotation of the surfacing attachment 16, and the diameter of the bore cut by the tool 40 is determined by the radius at which the tool is set by adjustment of the support member 22 on the cross-slide 17. For producing the axial reciprocation of the tool, a special mechanism is provided which will now be described.

A gearbox 42 is fixed to the front of the surfacing attachment 16, and at one end this gearbox projects outside the periphery of the attachment 16. An input shaft 44 is journaled in bearings 46, 48, 50 and 52 (see FIG. 4) within the gearbox 42, one end of the input shaft projecting rearwardly out of the box and having a gear pinion 54 fixed thereon. The pinion 54 has 19 teeth and meshes with the teeth of gear ring 56 (see also FIG. 3) which is fixed to the machine around the surfacing attachment. This arrangement provides a drive for the gearbox 42, and it will be apparent that as the surfacing head attachment 16 is rotated, the input shaft will be rotated about its own axis by virtue of the relative movement between the pinion 54 and the gear ring 56. The latter has 285 teeth, so that during one revolution of the attachment 16, the shaft 44 rotates 15 times.

A worm 58 formed on the input shaft 44 meshes with the teeth of a wormwheel 60 keyed on to an intermediate shaft 62 (FIGS. 4 and 5). The shaft 62 is journaled in bearings 64, 66, 68 and 70 and at the opposite end to the wormwheel, it carries a bevel pinion 72 which meshes with a bevel wheel 74 keyed on to a sleeve 76 which is splined internally to engage on a splined portion 78 of an output shaft 80. The sleeve 76 is journaled in bearings 82 and 84 within the box 42, and the arrangement provides a driving connection between the bevel wheel 74 and the output shaft 80, while permitting axial movement of the shaft 80.

Now the worm 58 has four threads, and the wormwheel 60 has 30 teeth, giving a speed reduction of 7½:1. The bevel gears 72 and 74 have equal numbers of teeth so that the overall ratio of the gearing between the fixed ring 56 and the output shaft 80 is 1:2, that is to say that for every revolution of the attachment 16, the shaft 80 rotates twice about its own axis. It should be understood that any arrangement of the gears which will produce this overall ratio of 1:2 will be effective.

The output shaft 80 extends between the brackets 24 and 26 and its upper end (as seen in the drawings), is enlarged, a boss 86 of the shaft, running in a ball bearing 88 within the bearing block 28. A shoulder 90 on the shaft 80 engages on the inner race of the bearing 88 and prevents downward movement of the shaft 80 relatively to the bearing block 28. The purpose of the splined connection between the shaft 80 and the sleeve 76 will now be apparent. This connection permits radial adjustment of the support member 22 although the gearbox 42 remains fixed.

A disc 92 formed on the top end of the output shaft 80 has segments cut away at the front and rear to provide flat faces 94 and 96 (see also FIG. 7), and a T-shaped groove 98 is cut across the disc 92 between and at right angles to the faces 94 and 96. Within the groove 98 there slides a driving block 100, which has rebates 102 along its top edges in which there engage retaining strips 104 fixed in the upper parts of the groove 98. A plate 106 closes the front end of the groove 98 and a plate 108 is fixed to the face 96 to prevent movement of the block 100 out of the rear of the disc 92. From the top face of the block 100 there projects a driving pin 110 and a steel wear-resistant ring 112 is rotatable on this pin 110. A groove 114 is formed across the underside of the toolholder 36, and when the latter is fitted into the toolslide of the support member 22, the ring 112 engages in the groove 114. As the shaft 80 is rotated, the pin 110 with its ring acts as a crank producing reciprocation of the toolholder 36 within the toolslide. This of course is the required movement of the toolholder, and it will be observed that the frequency of the reciprocation is correct because the toolholder will be reciprocated twice for each revolution of the surfacing attachment 16.

The amplitude of the toolholder reciprocation will depend upon the offset of the pin 110 from the axis of the shaft 80. If the block 110 is pulled forward to a position where the pin 110 is coaxial with the shaft 80, then there is no reciprocation of the toolholder, because the pin 110 simply revolves on its own axis and the ring 112 revolves in the groove 114. At the other extreme, if the block 110 is moved back against the plate 108, the "throw" of the crank is at a maximum and the toolholder moves almost the whole of the distance permitted by the slots 37. For adjusting the throw or the crank, an adjusting screw 116 is provided, and this screw engages in a screw threaded bore 118 in the block 100. The front end of the screw 116 passes through the retaining plate 106, and a collar 120 formed on the screw is trapped between the plate 106 and a cover plate 122 (recessed at 124 to receive the collar) fixed to the plate 106. Thus the screw 116 cannot move axially, and consequently, when it is rotated, the block 100 must slide in the groove 98. The head of the screw 116 is slotted at 126, and the tongue 128 of a screwdriver 130 is engageable in this slot. The screwdriver itself has a shank which is rotatable in a bore 132 in the bearing block 28. A compression spring 134 surrounds the shank of the screwdriver and engages between a shoulder in the bore 132 and a collar 136 on the screwdriver. A bush 138 screwed into an enlarged bore 140 retains the screwdriver in the block 28 and the outer end of the screwdriver is recessed at 142 to receive an Allen key.

To adjust the position of the block 100, and key is placed in the recess 142 and the screwdriver is pressed inwardly until its tongue 128 engages in the slot 126. The screw 116 can then be rotated to move the block 100, but as soon as pressure is released from the key, the spring 134 causes the screwdriver to be disengaged from the screw. For locking the block 100 in any selected position, there is a locking screw 144 (see FIGS. 5 and 6) which is screwed into a hole in the disc 92, and which can be engaged with the side face of the block 100. This locking screw is also recessed to receive an Allen key and access to it is obtained through holes 146 in the member 22 and 148 in the disc 92.

A pointer 150 fixed on the toolholder 36 cooperates with a scale 152 fixed on the member 22 to indicate the throw of the crank. The setting is made with the surfacing head turned to a datum position where the toolholder 36 is at its rearmost position in the tool slide. The offset or throw is adjusted according to the formula:

$$\text{Offset} = \frac{R - \sqrt{R^2 - r^2} \ (1 - \cos 2\theta)}{2}$$

as previously defined.

It would be possible to arrive at a strictly accurate contour by proper shaping of the slot 114 in the toolholder 36, but this would add to the expense of the machine without adding materially to the benefit derived from the invention.

I claim:

1. A boring machine provided with a toolholder adapted for powered compound movement having a rotary component and an axial reciprocating component in which a drive mechanism to said toolholder is arranged to produce a complete axial reciprocation of said toolholder for every 180° rotation of said toolholder, and in which said toolholder is capable or axial movement in guides (which are themselves adapted to provide said rotary component of said compound motion), and a crank device operatively connected to said toolholder slide to produce axial reciprocation thereof, said crank being driven in timed relationship to the mechanism which produces said rotary motion.

2. A boring machine as claimed in claim 1 in which said crank device has a crankpin with an adjustable throw.

3. A boring machine as claimed in claim 2, including locking means for locking said crank pin in an adjusted position.

4. A boring machine as claimed in claim 2, in which said crankpin is driven by gearing including a gear pinion carried by a surfacing attachment which also carries said toolholder, said pinion meshing with a gear ring fixed on said boring machine.

5. A boring machine as claimed in claim 3, in which said crankpin is driven by gearing including a gear pinion carried by a surfacing attachment which also carries said toolholder, said pinion meshing with a gear ring fixed on said boring machine.

6. A boring machine as claimed in claim 4, in which said gearing also includes a splined connection between a driving gear and an output shaft, whereby said shaft can move axially and in a lateral direction on said surfacing attachment to permit radial adjustment of said toolholder.

7. A boring machine as claimed in claim 5, in which said gearing also includes a splined connection between a driving gear and an output shaft, whereby said shaft can move axially and in a lateral direction on said surfacing attachment to permit radial adjustment of said toolholder.

8. A boring machine as claimed in claim 2, in which said crankpin is carried by a block slidable in a rotary member and there is a screw locked against radial movement in said rotary member, and engaging in a screwed hole in said block.

9. A boring machine as claimed in claim 8, in which there is a captive screwdriver which can be urged against resilient loading into engagement with said adjusting screw.

10. A boring machine as claimed in claim 2, in which said crankpin is offset from its axis of rotation by a distance given by the formula:

$$\text{Offset} = \frac{(R - \sqrt{R^2 - r^2}) \ (1 - \cos 2\theta)}{2}$$

where $R$ = outside radius of said cylinder in which said recess is to be cut: $r$ = said radius of hole, and $\theta$ = said angle of rotation of said tool.

* * * * *